(12) United States Patent
Kim et al.

(10) Patent No.: US 10,019,913 B2
(45) Date of Patent: Jul. 10, 2018

(54) INFORMATION ENCRYPTION SYSTEM AND INFORMATION ENCRYPTION METHOD USING OPTICAL CHARACTER RECOGNITION

(71) Applicants: POZE CO., LTD., Seoul (KR); Do-Hyung Kim, Cheonan-si (KR); Jae-Youl Shin, Seoul (KR); Jae-Sung Lee, Seoul (KR)

(72) Inventors: Do-Hyung Kim, Cheonan-si (KR); Jae-Youl Shin, Seoul (KR); Jae-Sung Lee, Seoul (KR)

(73) Assignee: POZE CO., LTD., Seoul (KR)

( * ) Notice: Subject to any disclaimer, the term of this patent is extended or adjusted under 35 U.S.C. 154(b) by 196 days.

(21) Appl. No.: 14/896,169

(22) PCT Filed: Nov. 11, 2013

(86) PCT No.: PCT/KR2013/010203
§ 371 (c)(1),
(2) Date: Dec. 4, 2015

(87) PCT Pub. No.: WO2014/200163
PCT Pub. Date: Dec. 18, 2014

(65) Prior Publication Data
US 2016/0314720 A1 Oct. 27, 2016

(30) Foreign Application Priority Data

Jun. 10, 2013 (KR) .................. 10-2013-0066069

(51) Int. Cl.
*G06F 21/72* (2013.01)
*G06F 21/10* (2013.01)
(Continued)

(52) U.S. Cl.
CPC .............. *G09C 5/00* (2013.01); *G06F 21/36* (2013.01); *G06F 21/606* (2013.01); *G06F 21/72* (2013.01);
(Continued)

(58) Field of Classification Search
CPC ............ G06F 2221/031; G06K 7/1417; G06K 7/1434; G06K 19/06065; G06K 7/10;
(Continued)

(56) References Cited

U.S. PATENT DOCUMENTS 7,299,281 B1 * 11/2007 Wang .................... G06Q 20/04
235/379
8,504,350 B2 8/2013 Lee et al.
(Continued)

FOREIGN PATENT DOCUMENTS

KR 10-2010-0012567 A 2/2010
KR 10-2010-0050638 A 5/2010
(Continued)

OTHER PUBLICATIONS

International Search Report for PCT/KR2013/010203, ISA/KR, Daejeon, dated Mar. 7, 2014.
(Continued)

*Primary Examiner* — Catherine B Thiaw
*Assistant Examiner* — Quy C Pham
(74) *Attorney, Agent, or Firm* — Harness, Dickey & Pierce, P.L.C.

(57) ABSTRACT

An information encryption system and an information encryption method for encrypting character information and decrypting the encrypted information by using optical character recognition includes a user terminal comprising: a viewer region display unit for displaying a viewer region at the very top of a screen; a viewer character recognition unit for recognizing in real-time characters displayed on a screen
(Continued)

region covered by the viewer region, a viewer character encryption unit for generating an encrypted character by encrypting a first character to be encrypted by using a cipher when the first character is recognized; an encrypted character substitution unit for deleting the first character and substitutively inputting the encrypted character; and a viewer character display unit for displaying a non-encrypted second character as it is, and decrypting an encrypted second character by using a cipher and displaying the same in an original character when the second character to be displayed is recognized.

17 Claims, 11 Drawing Sheets

(51) Int. Cl.
*H04L 9/08* (2006.01)
*G09C 5/00* (2006.01)
*G06F 21/36* (2013.01)
*G06F 21/84* (2013.01)
*G06F 21/60* (2013.01)

(52) U.S. Cl.
CPC ...... *G06F 21/84* (2013.01); *G06F 2221/2107* (2013.01)

(58) Field of Classification Search
CPC ...... G06K 9/186; G06K 15/401; G06K 19/00; G06K 2209/01; G06K 7/0004; G06K 9/00; G06K 9/00127; G06K 9/00221; G06K 9/00469
See application file for complete search history.

(56) References Cited

U.S. PATENT DOCUMENTS

| | | |
|---|---|---|
| 8,892,901 B2 | 11/2014 | Han |
| 2006/0075228 A1* | 4/2006 | Black .................. H04L 63/0428 713/167 |
| 2010/0115289 A1 | 5/2010 | Han |
| 2011/0019816 A1* | 1/2011 | Inami .................... G06F 21/608 380/28 |
| 2011/0066421 A1 | 3/2011 | Lee et al. |

FOREIGN PATENT DOCUMENTS

| | | |
|---|---|---|
| KR | 10-1263332 B1 | 5/2013 |
| KR | 10-1267875 B1 | 5/2013 |

OTHER PUBLICATIONS

Written Opinion of the ISA for PCT/KR2013/010203, ISA/KR, Daejeon, dated Mar. 7, 2014.

* cited by examiner

SCREENSHOT DISPLAYING DECRYPTED FORM ON VIEWER AFTER ENCRYPTION

DISPLAY ENCRYPTED SENTENCE AS IT IS BEFORE DECRYPTION WHEN VIEWER REGION IS REDUCED

WHEN VIEWER STARTS,
1(ENTER CONTENT)→
2(TOUCH SECURITY CHARACTER)     3(DISPLAY ENCRYPTED VALUE)

(ADDITIONAL NOTE:TARGET TO BE ENCRYPTED MAY BE RECOGNIZED
AND DISPLAYED USING OCR WITHIN VIEWER)

INFORMATION ENCRYPTION SYSTEM AND INFORMATION ENCRYPTION METHOD USING OPTICAL CHARACTER RECOGNITION

CROSS-REFERENCE TO RELATED APPLICATIONS

This application is a 371 U.S. National Stage of International Application No. PCT/KR2013/010203, filed Nov. 11, 2013, which claims the benefit of and priority to Korean Patent Application No. 10-2013-0066069, filed Jun. 10, 2013. The disclosures of the above applications are incorporated herein by reference.

TECHNICAL FIELD

The present disclosure relates to information encryption technology, and more particularly, to an information encryption system and an information encryption method that inputs an encrypted character and restores the encrypted character to its original form and displays the same, by using optical character recognition.

The present application claims priority to Korean Patent Application No. 10-2013-0066069 filed in the Republic of Korea on Jun. 10, 2013, the disclosure of which is incorporated herein by reference.

BACKGROUND ART

A user terminal displays information inputted through an input device and information read through a memory device on the screen. Also, the user terminal may transmit the information to other terminal via a network (e.g., SMS and messages).

There may be a variety of methods for the user terminal to perform security processing of the information. For example, a password setting method for information allows a user to execute, access, or use the information (e.g., log-in, lock screen, and open file) when password authentication of the user succeeds. Also, in message communication between user terminals, a transmitting terminal encrypts and transmits a message, and a receiving terminal receives and decrypts the encrypted message.

However, the foregoing security processing method disallows the user to selectively set an object to be encrypted and encrypts the whole information at one time. For example, in the password setting method for information, when the set password is exposed, security is unlocked and the whole information is all exposed. Also, in the encryption method for message communication, a message service provider can see an encrypted message, and an encryption service is provided to all messages at one time.

On the other hand, SNS (e.g., twitter, facebook, and kakaotalk), SMS, and a messenger application on a user terminal processes messages containing various contents, and not only a user but also other user can see the messages by manipulating the application. Suppose a computer terminal or a smart terminal of user A is given as an example, A's coworker, friend, and family could see stored information by manipulating A's user terminal. Also, because servers for communication service and application service involved during message communication relay the message communication, each service provider could freely see messages of the user. Here, if the user performs encryption when inputting information, information security of the user may be enhanced as only the user can decode the password.

DISCLOSURE

Technical Problem

The present disclosure is designed to solve the problem of the related art, and therefore, the present disclosure is directed to providing an information encryption system and an information encryption method that inputs an inputted character displayed on the screen as an encrypted character, restores the encrypted character to the original character and displays the original character, by using optical character recognition.

The present disclosure is further directed to allowing only a first user who set a password and a second user who received the password from the first user to see the content of a message during message transmission between the users.

The present disclosure is further directed to allowing a user to use a service from a service provider by using information encrypted personally by the user, independently from an encryption function provided by a service provider through an application.

Technical Solution

To achieve the above objects, an information encryption system using optical character recognition according to the present disclosure includes a user terminal including a viewer region display unit configured to display a viewer region on foremost of a screen, a viewer character recognition unit configured to recognize characters displayed on a screen region covered by the viewer region in real time using optical character recognition, a viewer character encryption unit configured to recognize at least one character displayed on a screen region covered by the viewer region in real time using optical character recognition, an encrypted character replacement unit configured to delete the first character, and instead, input the encrypted character, and a viewer character display unit configured to display, when the recognized character is a second character to be displayed, the second character which is non-encrypted as it is, and decrypt the second character which is encrypted, using the password, to display an original character.

Also, the information encryption system includes a user terminal including a viewer region display unit configured to display a viewer region on foremost of a screen, a viewer character recognition unit configured to intercept and recognize at least one inputted character before the inputted character is displayed on the viewer region in response to an input event generated on the screen covered by the viewer region, and recognize at least one character displayed on the viewer region in real time using optical character recognition, a viewer character encryption unit configured to encrypt, when the recognized character is a first character to be encrypted, the first character using a password set by a user to generate an encrypted character, an encrypted character replacement unit configured to input the encrypted character in place of the first character, and a viewer character display unit configured to display, when the recognized character is a second character to be displayed, the second character which is non-encrypted as it is, and decrypt the second character which is encrypted, using the password, to display an original character.

In the present disclosure, the viewer region display unit may display the viewer region in a transparent or translucent state on a screen of an application where a character is displayed.

Here, the viewer region may be a region in which a character to be encrypted is encrypted and an encrypted character is decrypted through the optical character recognition, and a size of the viewer region may be adjusted by the user's setting.

Also, the user terminal may recognize, as the first character, an inputted character displayed on the viewer region by the user's input, and may recognize, as the second character, an encrypted character inputted after being encrypted and an outputted character which is read from a recording device and is displayed.

Further, when the user terminal generates a character string with the encrypted character, the user terminal may generate the encrypted character string, the user terminal generates the encrypted character string containing a special character to identify the encryption.

According one aspect of the present disclosure, the user terminal may execute a viewer application which controls the viewer region, and the viewer application may input a character inputted by the user in other application as an encrypted character, and may display a decrypted original character such that the decrypted original character is superposed on the encrypted character displayed in other application.

Here, the user terminal may execute a dedicated application corresponding to the viewer application between a character input application and a general application allowing character input, or may execute a character input application having a function of the viewer application.

To achieve the above objects, an information encryption method using optical character recognition according to the present disclosure, by which a user terminal encrypts an inputted character, inputs an encrypted character, decrypts the encrypted character, and displays the decrypted character on a screen, the information encryption method including (a) a viewer region display step for displaying a viewer region on foremost of the screen of the user terminal, (b) a viewer character recognition step for recognizing at least one character displayed on a screen region covered by the viewer region in real time using optical character recognition, (c) a viewer character encryption step for encrypting, when the recognized character is a first character to be encrypted, the first character using a password set by a user to generate an encrypted character, (d) an encrypted character replacement step for inputting the encrypted character in place of the first character, and (e) a viewer character display step for displaying, when the recognized character at the step (b) is a second character to be displayed, the second character which is non-encrypted as it is, and decrypting the second character which is encrypted, using the password, to display an original character.

Advantageous Effects

According to one aspect of the present disclosure, a user may encrypt and input a character of an application, decrypt the encrypted character, and retrieve the original character, thereby enhancing information security.

Also, after only authorized users transmit and receive an encrypted message in a message application between the users, the original character may be retrieved, thereby enhancing message security.

Also, the user may perform encryption personally, separately from an encryption function provided from a service provider, so a personal friendly security service independent from a service may be provided to the user.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

<1. System Architecture>

Figure 1:
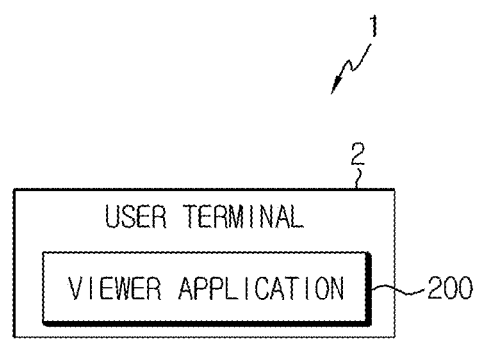
FIG. 1 is a schematic diagram showing the architecture of an information encryption system using optical character recognition according to an embodiment of the present disclosure.

FIG. 1 is a schematic diagram showing the architecture of an information encryption system 1 using optical character recognition according to an embodiment of the present disclosure.

The information encryption system 1 according to an embodiment of the present disclosure is configured to include a user terminal 2 where a viewer application 200 providing an information encryption service is executed.

The information encryption service recognizes information by an OCR method to allow only an authorized user to read the information, and encrypts the recognized non-encrypted information and decrypts the recognized encrypted information. Because inputted information is encrypted and stored as soon as the user inputs a character, the user needs to decrypt the encrypted information to see the character.

The user terminal 2 includes, but is not limited to, a computer terminal (e.g.: a PC, and a laptop computer) and smart terminal (e.g.: a smart phone, a smart pad, and a smart TV). Any user terminal 2 where the viewer application 200 can be installed and executed is included in the present disclosure.

Here, the user terminal 2 executes the viewer application 200, and the viewer application 200 displays a viewer region on the screen. The viewer region is displayed on the foremost of the screen, and characters of an application region covered by the viewer region are read by an Optical Character Reader (OCR) method. Then the user terminal 2 performs character encryption and decryption processing of the read character string. The viewer region corresponds to a region in which characters are recognized by an OCR method.

For example, suppose that an SMS message is transmitted and received in an SMS application between sender A and receiver B. The sender A executes the viewer application 200 on the user terminal 2, and sets a viewer region to cover a screen region of the SMS application. Also, the sender A sets a message input window as an encryption region, and sets a password "1234". The content of the character inputted by the sender A on the message input window is recognized in the viewer application 200 through the viewer region by an OCR method. When the recognized character is a non-encrypted character, the viewer application 200 performs encryption processing using the encryption key "1234" in real time, and the encrypted character is inputted in place of the inputted non-encrypted character. The SMS application receives and displays the encrypted character, while the viewer region covering the screen region of the SMS application displays the original character inputted by the user at the position of the encrypted character after the OCR recognized encrypted character is decrypted using the decryption key "1234". Subsequently, when A sends the encrypted character to B, the SMS application on the B's user terminal 2 displays the encrypted character content. Here, assume that B receives the password "1234" from A, B executes a viewer application and inputs the password 1234, so that a viewer region covers a region of the encrypted message. The message in which the encrypted characters are displayed in the B's SMS application is covered by the viewer region and recognized by OCR, and the recognized encrypted message is decrypted using the decryption key "1234" and the original message content is temporarily displayed. Of course, the viewer region of the viewer application 200 may provide the information encryption service to characters of a variety of general applications including a message program, a word program, and an office program on regions of the general applications by using an OCR method.

Figure 2:
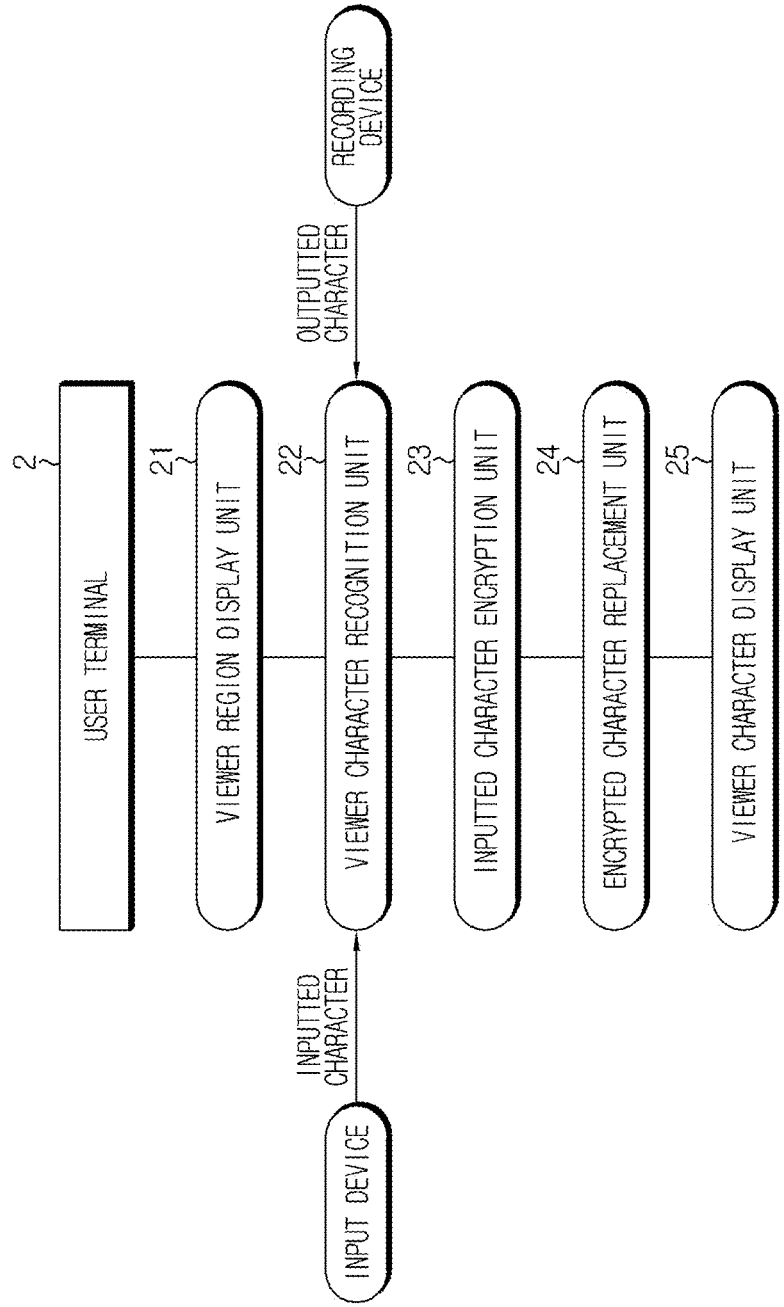
FIG. 2 is a schematic diagram showing an internal structure of a user terminal according to an embodiment of the present disclosure.

FIG. 2 is a schematic diagram showing an internal structure of the user terminal 2 according to an embodiment of the present disclosure.

The user terminal 2 of the present disclosure has the viewer application 200 installed therein, and the viewer application 200 is configured to include a viewer region display unit 21 to display a viewer region on the foremost of the screen, a viewer character recognition unit 22 to recognize a character of the viewer region by an OCR method, an inputted character encryption unit 23 to encrypt the recognized character, an encrypted character replacement unit 24 to replace the original character with the encrypted character, and a viewer character display unit 25 to decrypt the character recognized through a viewer if the recognized character was encrypted, and display the original character.

The viewer region display unit 21 displays a viewer region on the screen in response to the execution of the viewer application 200. The viewer region may be in a transparent or translucent state to display a content of a general application disposed under the viewer region, and is not limited thereto.

Here, the viewer region display unit 21 may control the size of the viewer region by the settings of the user. The set viewer region is where characters of a general application are recognized by an OCR method, and refers to a region in which an original character is encrypted in response to the region setting by the user and replaced with the encrypted character, and the encrypted character is decrypted and displayed. Of course, a non-encrypted character on the viewer region is displayed as it is.

The viewer character recognition unit 22 recognizes characters of an application region covered by the viewer region by an OCR method. On the region of the general application, a character inputted by the user through an input device (e.g., a keyboard, an on-screen keypad, and the like) or a character inputted by other input event (e.g., a paste and the like) may be displayed. Also, character data read from a recording device may be displayed on the region of the general application. Thus, the viewer character recognition unit 22 may recognize the character inputted by the input event and the outputted character read from the recording device through the viewer region.

When the recognized character is designated as a target to be encrypted, the inputted character encryption unit 23 encrypts the designated character. By the environment setting through the viewer application 200, the user may designate the entire viewer region as a target for encryption and may designate a part of the viewer region as a target for encryption.

Here, the inputted character encryption unit 23 may generate an encrypted character by using the password set by the user as an encryption key, or may generate an original character into an encrypted character by using an encryption key obtained by referring to an encryption table.

Also, the inputted character encryption unit 23 may generate a character string containing a special character to allow identification as an encrypted character. There is no limitation on the special character. That is, the character string allowing a special character to be identified is an encrypted character. Further, so long as it is possible to identify an encrypted character, the encrypted character may be identified by other display effects (e.g., underline and shading) instead of the special character.

The encrypted character replacement unit 24 generates an input event for the encrypted character, instead of the original character inputted in the general application. By the input event, the application disposed under the viewer region receives an input of the encrypted character and displays the encrypted character, instead of the original character.

For example, when the character inputted by the user is displayed on the screen of the general application, the encrypted character replacement unit 24 may generate a delete event for the originally inputted character displayed on the screen, and generate an input event for the encrypted character at the same position to replace the inputted character with the encrypted character. If input event information is intercepted (e.g.: hooking) before the character inputted by the user is displayed on the screen of the application, the inputted character is replaced with the encrypted character by using the intercepted input event information, so the general application may receive an input of the encrypted character and display the encrypted character on the screen.

The viewer character display unit 25 displays the character recognized through the viewer region by an OCR method. Here, the viewer character display unit 25 is in a transparent or translucent state to display the viewer region, and decrypts a character string containing the character identified as having been encrypted in the general application and displays it on the viewer region. For example, when the character of the general application on the viewer region is a non-encrypted character disallowing the identification of a special character, the viewer character display unit 25 displays the non-encrypted character of the general application as it is through the viewer region without separate processing. However, when the character of the general application is an encrypted character including the special character, the viewer character display unit 25 decrypts the encrypted character recognized by an OCR method through the viewer region to restore it to the original character, and displays the decrypted original character at the position of the encrypted character of the general application. Here, encryption of the user used as an encryption key is used as a decryption key. Thus, while the viewer region covers the general application region, the user may retrieve the decrypted character through the viewer region, not the encrypted character.

Figure 3:
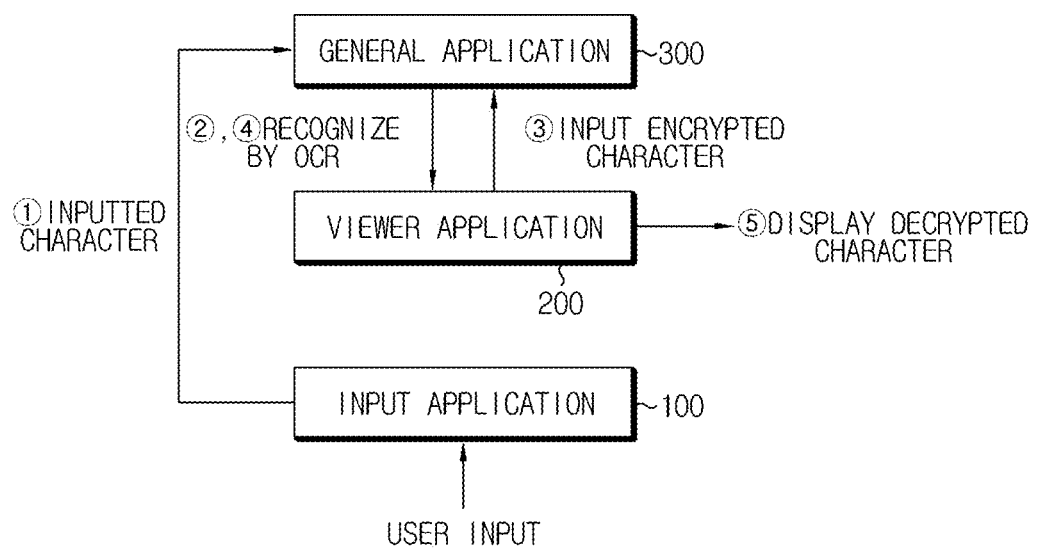
FIGS. 3 and 4 are diagrams showing examples of an execution environment of a viewer application according to an embodiment of the present disclosure.
Figure 4:
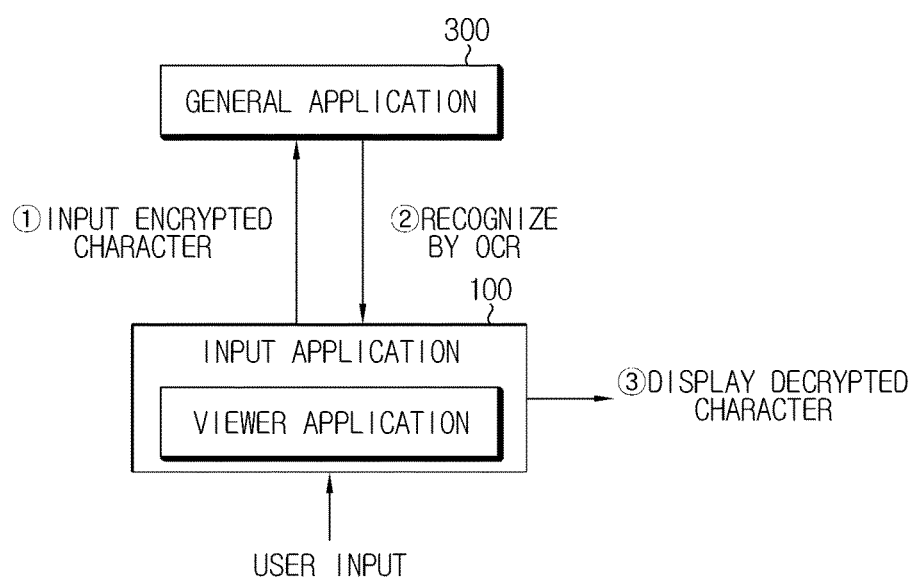

FIGS. 3 and 4 are diagrams showing examples of an execution environment of the viewer application 200 according to an embodiment of the present disclosure.

Referring to FIG. 3, the viewer application 200 is created as a standalone special purpose application, and may provide the information encryption service between an input application (e.g., a keyboard program) and a general application (e.g., an SMS, an SNS, an office program, and a mail).

When the viewer application 200 runs, the viewer application 200 replaces, with an encrypted character, an original character requested for encryption among characters of a general application covered by a viewer region, and inputs the encrypted character to the general application. Also, the viewer application 200 decrypts the encrypted character of the viewer region and displays the decrypted character on the viewer region. Here, the viewer application 200 recognizes the character of the general application requested for encryption by an OCR method, encrypts the recognized character, generates a delete event for the original character of the general application, generates an input event for the encrypted character, and replaces the original character with the encrypted character.

Referring to FIG. 4, the function of the viewer application 200 may be embedded in an OS program of the user terminal 2 or a keyboard program and may be created as an input application 100.

When encryption processing of a character inputted in the input application 100 is requested, the input application 100 may intercept event information before a character for which an input event has been generated is displayed on the region of the general application 300, and may replace the original character of the event information with the encrypted character. Then, the generated event information conveys the encrypted character to the general application 300 in place of the original character. When the encrypted character is displayed on the region of the general application 300, the encrypted character is recognized by OCR through the viewer region, and the recognized encrypted character is decrypted so that it is restored to the original character, which is then displayed on the viewer region.

FIGS. 5 through 10 are diagrams showing examples of screenshots from the user terminal 2 according to an embodiment of the present disclosure.

Figure 5:
FIGS. 5 through 10 are diagrams showing examples of screenshots from a user terminal according to an embodiment of the present disclosure.
Figure 5:

Referring to FIG. 5, for convenience of description, suppose that the user terminal 2 is a mobile phone terminal, the viewer application 200 runs as a standalone program as shown in FIG. 3, and the general application 300 is an SMS application. Suppose that a viewer region 201 is disposed on the region of the SMS application and covers an input window and a message display window of the SMS application. Also, suppose that the input window is set as an encryption region.

Here, when a user inputs "49384-34" through a keypad, the input window of the SMS application displays a character string "49384-34". Then, the viewer application 200 recognizes the character string "49384-34" displayed on the input window by OCR and encrypts it to generate an encrypted character of "♦rT01E3AA1". Here, '♦' denotes an identifier of the encrypted character. The viewer application 200 generates a delete event for the original character "49384-34", and generates an input event for "♦rT01E3AA1" at the same position as the original character. Then, the input window of the SMS application receives an input of the encrypted character, not the original character, and displays "♦.rT01E3AA1". Subsequently, the viewer application 200 recognizes the encrypted character including '♦' on the input window by OCR, decrypts it, and displays the original character "49384-34" at the input window position of the viewer region, instead of the encrypted character. In this instance, the user controls the size of the viewer region 201 to display the actually inputted encrypted character "♦.rT01E3AA1" when the input window is outside of the viewer region 201. When the user presses a send button, the encrypted character is displayed on a message display window, and a receiver receives the encrypted character. The transmitted encrypted message is stored in an SMS mailbox. Subsequently, the receiver cannot see the original character "49384-34" through the viewer region 201 until the receiver runs the viewer application 200 on the user terminal 2 of the receiver and inputs encryption transmitted from the sender. Thus, when characters are encrypted in the general application 300 which allows transmission and receipt of messages with others such as including an SMS, a messenger, and a mail, security is only maintained between a sender and a receiver sharing encryption. In this instance, service providers (e.g., kakaotalk, twitter, and facebook) and communication service providers (e.g., sk, kt, and lg) of the general application 300 also see the content in encrypted characters, not in original characters.

Figure 6:
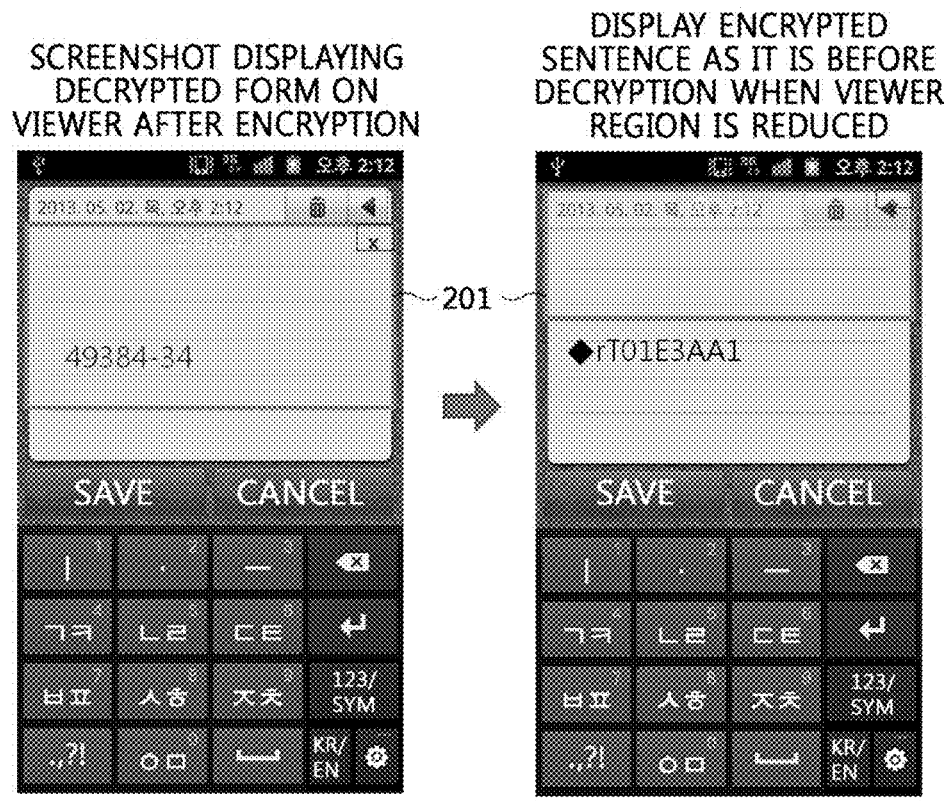

Referring to FIG. 6, a screenshot showing that the general application 300 of FIG. 5 is changed to a memo application is displayed. Likewise, a character inputted by a user is replaced with an encrypted character which is then displayed on the screen of the memo application, and the encrypted character is decrypted so that it is restored to the original character which is only temporarily displayed through the viewer region 201. Of course, when the viewer region 201 is outside of the region of the encrypted character, the encrypted character inputted in the memo application is displayed. Thus, if other person manipulates the memo application of the user, he/she cannot decrypt the encrypted character because he/she does not know the password of the user.

Figure 7:
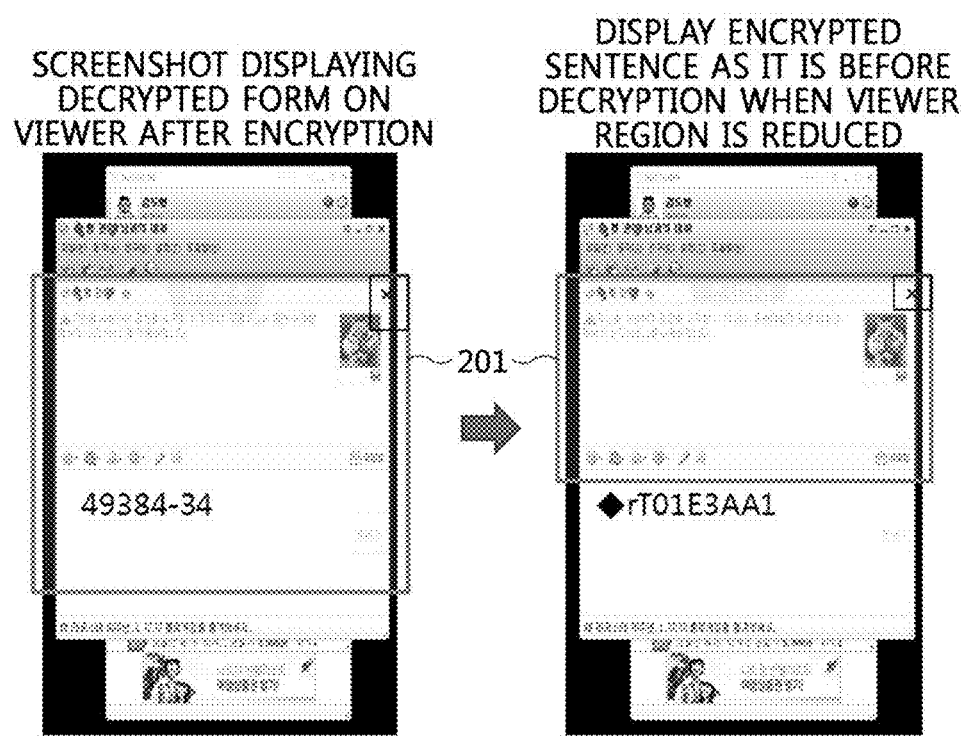

Referring to FIG. 7, a screenshot showing that the application 300 of FIG. 5 is changed to a messenger application is displayed. When a real-time conversation is made through a messenger, a password is set to allow only a sender and a receiver to make conversation through an encrypted message while being in a security state.

Figure 8:
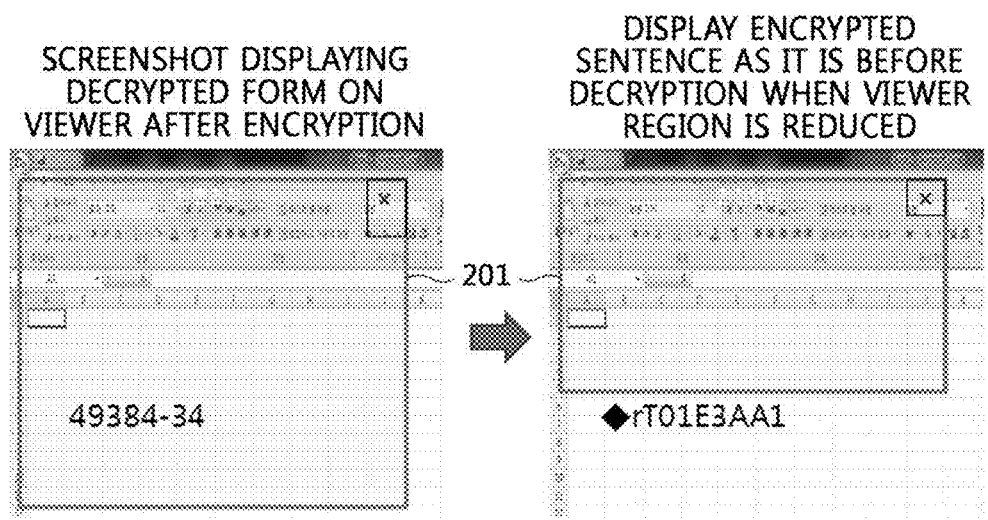

Referring to FIG. 8, a screenshot showing that the application 300 of FIG. 5 is changed to an excel program is displayed. The user may designate a target character region for encryption by the viewer application 200 in excel, and may input data as encrypted data.

Figure 9:
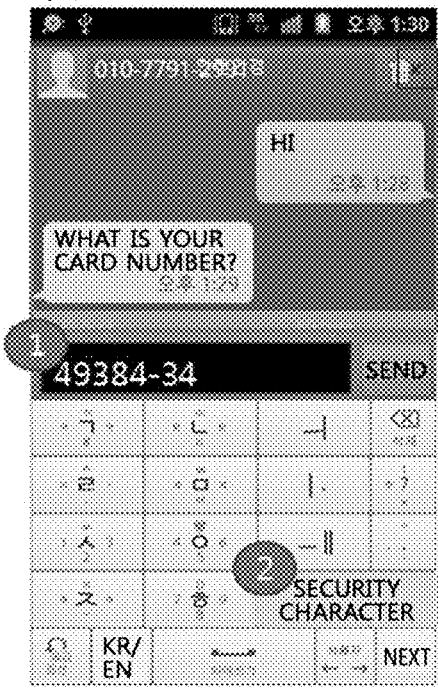
Figure 9:
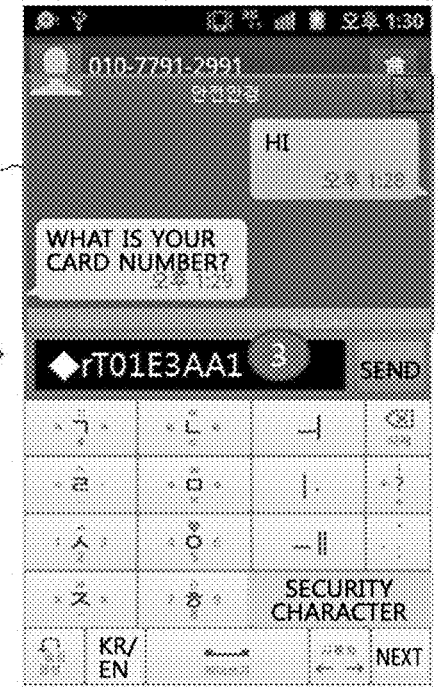

FIG. 9 shows the input application 100 with a built-in function of the viewer application 200 in the mobile phone terminal as shown in FIG. 4. The general application 300 is an SMS application for illustration purposes. When the user inputs the character "49384-34" on an input window and presses a "security character" key, the encrypted character "♦.rT01E3AA1" is displayed on the input window instead. When the user presses a send button, a message of the encrypted character on the input window is transmitted to a receiver, and stored in the user terminal 2. The user may place the viewer region on the encrypted message region and retrieve the restored message.

Figure 10:
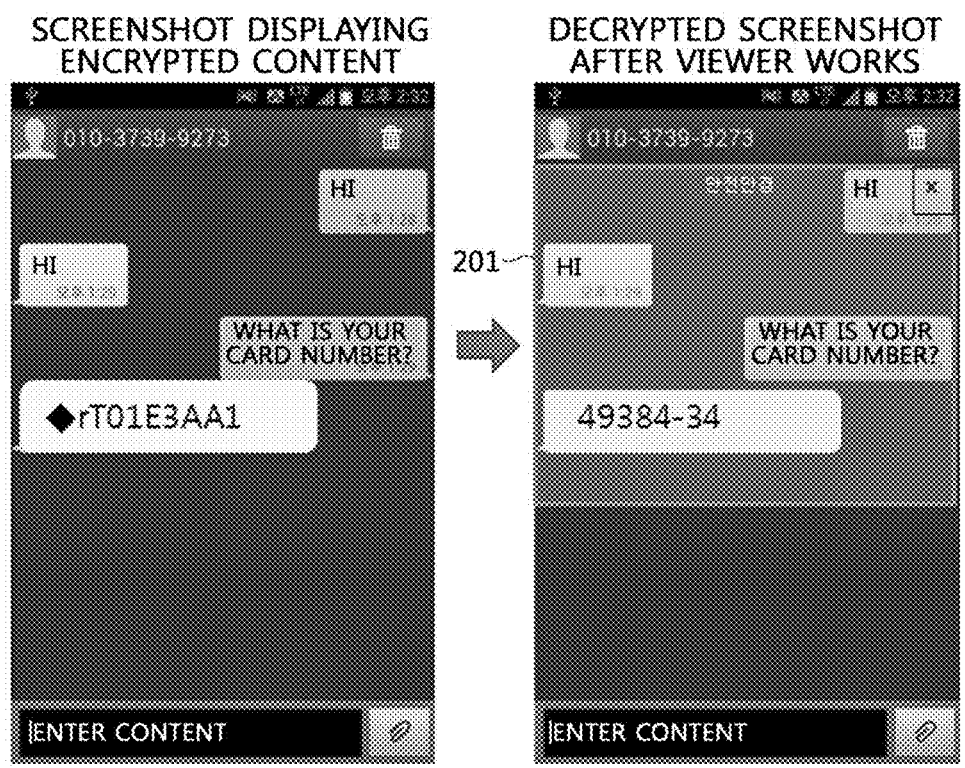

FIG. 10 is a screenshot showing that the user receives an SMS of the encrypted character. The user runs the viewer application 200 and sets the viewer region 201 to cover the region of the encrypted character. Also, the user inputs the password that the sender let the user know. The encrypted character is restored to the original character "49384-34" and displayed through the viewer region 201.

<2. Method Configuration>

An information encryption method using optical character recognition according to an embodiment of the present disclosure may be preferably implemented through construction of the above mentioned information encryption system 1.

Figure 11:
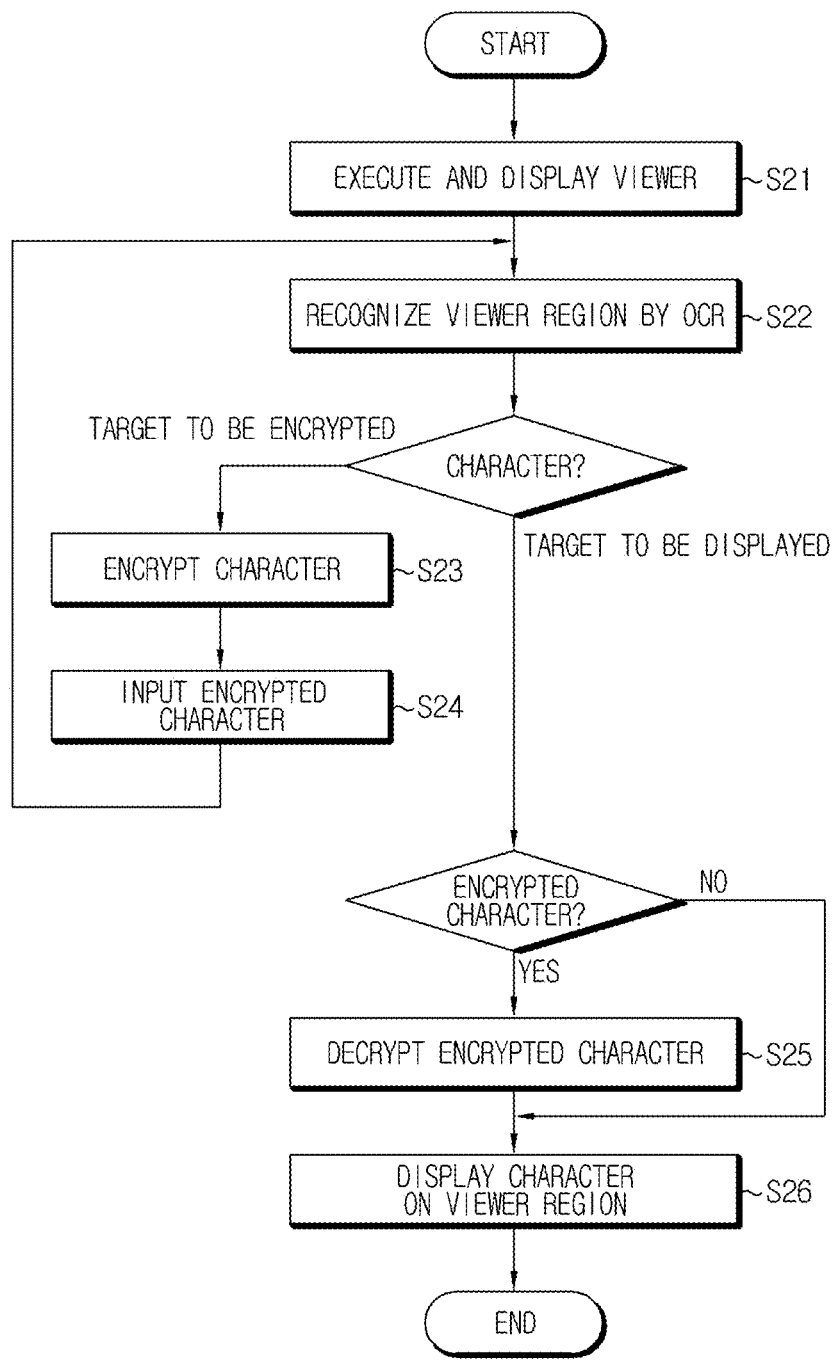
FIG. 11 is a schematic flowchart of an information encryption method according to an embodiment of the present disclosure.

FIG. 11 is a schematic flowchart of an information encryption method according to an embodiment of the present disclosure.

The user terminal 2 is where the viewer application 200 is installed and executed, and the viewer application 200 displays a viewer region in a transparent or translucent state on the foremost of the screen (S21). A user may move the viewer region to a particular location or may control the size of the viewer region. Subsequently, the user may set a password for the viewer region. The set password may be used as an encryption key and a decryption key.

The user terminal 2 recognizes characters of a general application region by an OCR method, with the general application region covered by the viewer region (S22).

For example, an inputted character that is inputted by the user in the general application, an encrypted character that is inputted in place of the inputted character after encrypting the inputted character, and an outputted character that is read by the application and outputted to the screen is read by an OCR method.

After the OCR recognition is completed, when a character to be encrypted is disposed on an encryption region of the viewer region, the user terminal 2 encrypts the character of the region designated as a target for encryption in real time (S23). Here, the encryption region may be selected by the user, such as an input window where the user types or sets a block. The character inputted in the encryption region is encrypted to generate an encrypted character. Also, to identify that encryption processing was performed, the generated encrypted character may include a special character and an identifier, or may be undergone other indication effect.

When the encryption processing is completed, the user terminal 2 inputs the encrypted character undergone encryption instead of the original character of the application recognized through the viewer region (S24).

Here, when the viewer application 200 is executed independently as shown in FIG. 3, in response of a character input event of the user, the inputted character is displayed on the screen region of the application and recognized through OCR recognition, and then the user terminal 2 deletes the inputted character of the application, and instead, generates an input event of the encrypted character.

Also, as shown in FIG. 4, when the input application 100 has an incorporated viewer function, in response to a character input event of the user, the user terminal 2 extracts the inputted character from the generated event information and recognizes it before the inputted character is displayed on the region of the application by the event. Subsequently, the user terminal 2 replaces the inputted character of the event information with the encrypted character to generate an input event of the encrypted character.

Then, at S22, the general application receives an input of the encrypted character rather than the original character and displays it on the screen.

When the replaced encrypted character is displayed on the region of the general application, the encrypted character is recognized by an OCR method through the step S22. Also, at S22, encrypted characters and non-encrypted characters of the general application included in the viewer region are recognized.

Subsequent to S22, the user terminal 2 determines whether the recognized character was encrypted, and displays the character through the viewer region. A character recognized as a non-encrypted character is displayed as it is through the viewer region.

If the encrypted character is recognized by the special character, the user terminal 2 decrypts the recognized encrypted character by the decryption key to restore it to the original character (S25).

When the decryption processing is completed, the user terminal 2 displays the decrypted original character such that the decrypted original character is superposed on the encrypted character of the general application (S26).

In the foregoing exemplary embodiments, the term "~unit" is not used to represent hardware components of the lost password processing system 1. Thus, a plurality of components may be integrated into one component, and one component may be divided into a plurality of components. Also, the components may represent hardware components, but may also represent software components. Accordingly, it should be understood that the present disclosure is not specially limited by the term "~unit".

While the present disclosure has been hereinabove described by a limited number of embodiments and drawings, the present disclosure is not limited thereto and it should be understood that various changes and modifications may be made by those having ordinary skill in the art within the scope of the disclosure and the appended claims and their equivalents.

What is claimed is:

1. An information encryption system comprising:
a user terminal comprising:
   a processor;
   a memory;
      a viewer application stored in the memory and configured to be executed by the processor, wherein the viewer application, when executed by the processor, causes the user terminal to:
      display a viewer region controlled by the viewer application, on foremost of a screen;
      recognize at least one character displayed on a screen region of the viewer application or another application covered by the viewer region in real time using optical character recognition;

encrypt, when the recognized character is a first character to be encrypted, the first character using a password set by a user of the user terminal to generate an encrypted character;

delete the first character on the screen region, and instead, input the encrypted character on the screen region of the viewer application or another application; and in response to the user of the user terminal moving or resizing the viewer region such that the viewer region covers a second character, recognize the second character in real time using the optical character recognition:

in response to determining, by the user terminal, the second character as a non-encrypted character when a special character is not identified from a character string of the second character, display the second character which is non-encrypted as it is;

in response to determining, by the user terminal, the second character as a second encrypted character when the special character is identified, decrypt the second character which is encrypted, using the password, to display an original character and display a decrypted original character such that the decrypted original character of the viewer region is superposed on the second encrypted character of the screen region displayed in the viewer application or another application.

2. The information encryption system according to claim 1, wherein the viewer region is displayed in a transparent or translucent state on the screen region where a character is displayed.

3. The information encryption system according to claim 1, wherein the viewer region is a region in which a character to be encrypted is encrypted and an encrypted character is decrypted through the optical character recognition, and a size of the viewer region is adjusted by the user's setting.

4. The information encryption system according to claim 1, wherein the user terminal recognizes, as the first character, an inputted character displayed on the viewer region by the user's input, and recognizes, as the second character, an encrypted character inputted after being encrypted and an outputted character which is read from a recording device and is displayed.

5. The information encryption system according to claim 1, wherein when the user terminal generates an encrypted character string, the user terminal generates the encrypted character string containing the special character to identify the encryption.

6. The information encryption system according to claim 1, wherein the user terminal executes a dedicated application corresponding to the viewer application between a character input application and a general application allowing character input, or executes a character input application having a function of the viewer application.

7. An information encryption system comprising:
a user terminal comprising:
a processor;
a memory;
a viewer application stored in the memory and configured to be executed by the processor, wherein the viewer application, when executed by the processor, causes the user terminal to:
display a viewer region controlled by the viewer application, on foremost of a screen;

intercept and recognize at least one inputted character before the inputted character is displayed on the viewer region in response to an input event generated on the screen of the viewer application or another application covered by the viewer region, and recognize at least one character displayed on the viewer region in real time using optical character recognition;

encrypt, when the recognized character is a first character to be encrypted, the first character using a password set by a user of the user terminal to generate an encrypted character;

input the encrypted character on the screen of the viewer application or another application in place of the first character; and in response to the user of the user terminal moving or resizing the viewer region such that the viewer region covers a second character, recognize the second character in real time using the optical character recognition:

in response to determining, by the user terminal, the second character as a non-encrypted character when a special character is not identified from a character string of the second character, display the second character which is non-encrypted as it is;

in response to determining, by the user terminal, the second character as a second encrypted character when the special character is identified, decrypt the second character which is encrypted, using the password, to display an original character and display a decrypted original character such that the decrypted original character of the viewer region is superposed on the second encrypted character displayed in the viewer application or another application.

8. An information encryption method by which a user terminal encrypts an inputted character, by executing a viewer application, the information encryption method comprising:

displaying, by the viewer application, a viewer region, controlled by the viewer application, on a foremost of a screen of the user terminal;

recognizing at least one character displayed on a screen region of the viewer application or another application, covered by the viewer region in real time using optical character recognition;

encrypting, when the recognized character is a first character to be encrypted, the first character using a password set by a user of the user terminal to generate an encrypted character;

inputting the encrypted character on the screen region of the viewer application or another application in place of the first character; and in response to the user of the user terminal moving or resizing the viewer region such that the viewer region covers a second character, recognize the second character in real time using the optical character recognition:

in response to determining, by the user terminal, the second character as a non-encrypted character when a special character is not identified from a character string of the second character, display the second character which is non-encrypted as it is;

in response to determining, by the user terminal, the second character as a second encrypted character when the special character is identified, decrypting the second character which is encrypted, using the password, to display an original character, and displaying a decrypted original character such that the decrypted original character of the viewer region is superposed on the second encrypted character displayed in the viewer application or another application.

9. The information encryption method according to claim 8, wherein displaying a viewer region comprises displaying the viewer region in a transparent or translucent state on a screen of an application where a character is displayed.

10. The information encryption method according to claim 8, after displaying the viewer region, further comprising:
receiving, by the user terminal, the user's region setting for the viewer region to be encrypted and decrypted, and adjusting a size of the region.

11. The information encryption method according to claim 8, before recognizing, further comprising:
receiving, by the user terminal, setting of the password as a key used for encryption and decryption from the user.

12. The information encryption method according to claim 8, wherein recognizing comprises recognizing, by the user terminal, as the first character, an inputted character displayed on the viewer region by the user's input, and recognizing, as the second character, an encrypted character inputted after being encrypted and an outputted character which is read from a recording device and is displayed.

13. The information encryption method according to claim 8, wherein encrypting comprises generating, by the user terminal, a character string containing the special character to allow identification as an encrypted character string when generating a character string with the encrypted character.

14. The information encryption method according to claim 8, wherein after the user's character input event is generated, and an inputted character is displayed on the screen by the event, and the inputted character on the screen is recognized through the optical character recognition, and
wherein inputting comprises deleting, by the user terminal, the inputted character displayed on the screen and instead generating an input event of the encrypted character.

15. The information encryption method according to claim 8, wherein after the user's character input event is generated, and an inputted character is extracted from the generated event information and is recognized before the inputted character is displayed on the screen by the event and,
wherein inputting comprises replacing, by the user terminal, the inputted character of the event information with the encrypted character to generate an input event of the encrypted character.

16. The information encryption method according to claim 8, wherein displaying the second character comprises determining, by the user terminal, the second character as a non-encrypted character when the special character is not identified from a character string of the second character, and an encrypted character when the special character is identified.

17. The information encryption method according to claim 8, wherein the user terminal executes a dedicated application corresponding to the viewer application between a character input application and a general application allowing character input, or executes a character input application having a function of the viewer application.

* * * * *